United States Patent
Lai et al.

(10) Patent No.: US 8,586,114 B2
(45) Date of Patent: Nov. 19, 2013

(54) METHOD FOR PRODUCING STINKY BRINE FOR USE IN PRODUCTION OF STINKY TOFU AND FERMENTATION BROTH USED THEREFOR

(71) Applicant: Food Industry Research & Development Institute, Hsinchu (TW)

(72) Inventors: Jinn-Tsyy Lai, Hsinchu (TW); Fang-Yi Cheng, Bade (TW); Chin-Chu Ho, Taipei (TW); Fwu-Ling Lee, Hsinchu (TW); Han-Ken Chen, Hsinchu (TW); Chii-Cherng Liao, Taipei (TW)

(73) Assignee: Food Industry Research & Development Institute, Hsinchu (TW)

( * ) Notice: Subject to any disclaimer, the term of this patent is extended or adjusted under 35 U.S.C. 154(b) by 0 days.

(21) Appl. No.: 13/658,363

(22) Filed: Oct. 23, 2012

(65) Prior Publication Data

US 2013/0142906 A1    Jun. 6, 2013

(30) Foreign Application Priority Data

Dec. 6, 2011 (TW) .............................. 100144786 A
Mar. 14, 2012 (TW) .............................. 101108579 A (51) Int. Cl.
    A23C 9/12       (2006.01)
    C12N 1/20       (2006.01)
(52) U.S. Cl.
    USPC .......................................... 426/61; 435/253.6
(58) Field of Classification Search
    USPC .......................................... 426/61; 435/253.6
    See application file for complete search history.

(56) References Cited

U.S. PATENT DOCUMENTS 6,106,873 A * 8/2000 Huang et al. .................. 426/46
6,350,606 B1 * 2/2002 Huang et al. ............... 435/252.4

* cited by examiner

*Primary Examiner* — Humera Sheikh
*Assistant Examiner* — Bhaskar Mukhopadhyay
(74) *Attorney, Agent, or Firm* — McClure, Qualey & Rodack, LLP (57) ABSTRACT

A method for producing stinky brine for use in production of stinky tofu and a fermentation broth used therefore is provided. The method for producing stinky brine includes steps of inoculating a fermentation broth with microflora for producing the stinky brine. The fermentation broth includes at least 85~153 g/L of tryptone and 15~27 g/L of soytone, which may further include a trace amount of glucose, sodium chloride, dipotassium phosphate or a combination thereof.

14 Claims, 14 Drawing Sheets

METHOD FOR PRODUCING STINKY BRINE FOR USE IN PRODUCTION OF STINKY TOFU AND FERMENTATION BROTH USED THEREFOR

CROSS REFERENCE TO RELATED APPLICATIONS

This application claims the priority of Taiwan Patent Application No. 101108579, filed Mar. 14, 2012, which claims the priority of Taiwan Patent Application No. 100144786, filed Dec. 6, 2011.

BACKGROUND OF THE INVENTION

1. Field of the Invention

The present invention relates to a method for producing stinky brine for use in the production of stinky tofu.

2. Description of the Related Art

Stinky tofu is a delicacy for many Chinese because of the particular smell and flavor. The smell and flavor primarily comes from the fermentation of stinky brine. Traditionally, stinky tofu is made by immersing uncooked tofu in stinky brine at room temperature from one day to a week. The stinky brine is traditionally obtained from a blend of cabbages, bamboo shoots, tofu, shrimps, salt and the like as the original material under an open fermentation for one week or more.

However, the texture and taste of stinky brine is not always consistent because the original materials are from nature and the ingredients are likely to change during different seasons of the year or different years, or the like. Also, traditionally, sanitary conditions for producing stinky brine my not be so favorable, due to the requirement for open fermentation for several weeks.

To solve the consistency and sanitary problems, standards for producing stinky brine has been considered.

Taiwan Patent No. 1496731 discloses a method for producing stinky tofu which starts from preparing stinky brine. The stinky brine consists of cabbages, bamboo shoots, shrimps and salt in a specific ratio. The stinky brine was then inoculated with specific microflora for fermentation in an open space. Then, the fermented stinky brine was used for production of stinky tofu.

China Patent No. CN101147548 also discloses a method for producing fried stinky tofu. The method starts from preparing the stinky brine by boiling a blend of 12~13% of amaranth stems, 12~13% of bamboo shoots, 4~6% of fresh soybean milks, 2~3% of ginger, 2~3% of licorice roots and 0.2~0.3% of Chinese red peppers in water at first and adding 4~6% of millet wine, 4~6% of salt and 9~11% of pickled mustard after the blend was cooled. The prepared stinky brine was then statically fermented in a closed container for four months to one year. Then the fermented stinky brine was used for production of stinky tofu.

For stinky brine fermentation, Lee et al discloses the optimal conditions for producing ammonia. Cabbages, bamboo shoots, tofu, shrimps and salt as the brine materials were used and the brine materials were fermented under a static fermentation for 4~6 weeks (Lee, S. F., et al., Optimal conditions for ammonia production of stinky brine, the fermented broth used to make stinky tofu. Taiwanese Journal of Agricultural Chemistry and Food Science (April 2001) 39(2):162-164). Lee et al detected the ammonia nitrogen concentration of the fermented stinky brine by using the Nessler method and indicated that the ammonia nitrogen concentration could be a quantitative indicator of fermentation degree.

For seeking scientific formulations and methods for producing stinky tofu which has consistency and meeting sanitary requirements, the inventors have studied the conditions relating to the smell and flavor of stinky tofu.

BRIEF SUMMARY OF THE INVENTION

A detailed description is given in the following embodiments with reference to the accompanying drawings.

One embodiment of the invention provides a method for producing a stinky brine, which comprises the following steps:

(i) providing a microflora having the ability to produce the stinky brine;

(ii) inoculating a fermentation broth with the microflora; and (iii) incubating the fermentation broth.

The fermentation broth used in the method comprises 85~153 g/L of tryptone and 15~27 g/L of soytone, at least.

In another embodiment, the invention provides a fermentation broth for use in the said method for producing the stinky brine. The fermentation broth comprises 85~153 g/L of tryptone and 15~27 g/L of soytone, at least.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention is a method for producing a stinky brine comprising the following steps:

(i) providing a microflora having the ability to produce the stinky brine;

(ii) inoculating a fermentation broth with the microflora; and (iii) incubating the fermentation broth, wherein the fermentation broth comprises 85~153 g/L of tryptone and 15~27 g/L of soytone, at least.

The term "stinky brine" refers to a composition which transforms uncooked tofu into stinky tofu having a distinct smell and flavor, which is also named "brine". In fact, the smell and flavor of the stinky tofu comes from the brine through a fermentation process. In practice, the uncooked tofu is immersed into the stinky brine for several hours to several days to produce the stinky tofu having a distinct smell and flavor smell and flavor.

The "microflora having the ability to produce the stinky brine" refers to the microflora which is capable of producing stinky brine and there is no specific limitation. In one example, the microflora having the ability to produce the stinky brine may comprise Bacillus sp., Enterococcus sp., Lactobacillus sp. or a combination thereof.

In one example, the microflora deposited in the China Center for Type Culture Collection (CCTCC; Wuhan University, Wuhan 430072 P.R. China) on Dec. 8, 1998 under the Budapest Treaty with the accession number M 98023 can be used for producing the stinky brine according to the invention. The deposited microflora has been published in China Patent No. CN1231576C on Dec. 14, 2005 and is readily available for the public.

In another example, the microflora deposited in the CCTCC (Wuhan University, Wuhan 430072 P.R. China) on Dec. 8, 1998 under the Budapest Treaty with the accession number M 98024 can be used for producing the stinky brine according to the invention. The deposited microflora has been published in China Patent No. CN1231576C on Dec. 14, 2005 and is readily available for the public.

The microflora CCTCC M 98023 and CCTCC M 98024 were originally obtained from stinky brine samples collected from several regions of Taiwan. The collected stinky brine samples were first diluted for incubation, and the microflora which produced the stinky smell after the incubation was collected to obtain the microflora CCTCC M 98023 and CCTCC M 98024. These microflora were identified by gas chromatograph of whole cell fatty acids (Miller, L. and Berger, J., Bacteria Identification by Gas Chromatograph of Whole Cell Fatty Acids, HP Application Note. 288.41 (1985)) according to the standards and analyses of Microbial ID System (MIS). The microflora CCTCC M 98023 was identified, including Bacillus sphaericus and unnamed strains of Enterococcus sp. and Lactobacillus sp. The microflora CCTCC M 98024 was identified, including Bacillus sphaericus, Enterococcus avium, Enterococcus casseliflavus, and Enterococcus durans.

The microflora used in the invention is not limited to the microflora CCTCC M 98023 and CCTCC M 98024. All microorganisms or their combinations which have the ability to produce the distinct smell and flavor of stinky tofu are included.

For obtaining a preferable smell and flavor, the microflora according to the invention is adjusted to an optical density at 600 nm ($OD_{600}$) of 0.55~0.6 before inoculation. The optical density at 600 nm ($OD_{600}$) refers to the light absorbance of the microbial culture at the wavelength of 600 nm, which is commonly used for indicating the microbial density in the art.

According to the invention, there is no specific limitation to make the microflora reach $OD_{600}$ value 0.55~0.6. In one example, the microflora CCTCC M 98023 and CCTCC M 98024 are pre-inoculated to trypticase soy broth (TSB) for activation and proliferation for reaching the $OD_{600}$ value 0.55~0.6 before the inoculation. In another example, the microflora having reached the $OD_{600}$ value 0.55~0.6 before inoculation can be directly inoculated to the fermentation broth without any activation or proliferation process.

As the microflora reaches the $OD_{600}$ value 0.55~0.6, the microflora inoculation rate according to the invention can be 1% by volume or more based on the total volume of the fermentation broth, but is not limited thereto. The inoculation rate refers to the bacterial amount of the microflora inoculated to the broth or medium. The inoculation rate is usually represented by the volume ratio based on the broth or medium for inoculation. In one example, the microflora inoculation rate according to the invention may be 1~5% by volume based on the total volume of the fermentation broth for operative convenience.

The fermentation broth recited herein refers to the broth for the microflora incubation as described above. The fermentation broth according to the invention can replace the traditional brine consisting of cabbages, shrimps or the like and can produce stinky tofu having a stable and consistent smell and flavor similar to the traditional one.

The fermentation broth according to the invention is a modified trypticase soy broth (TSB) formulation for producing an appropriate ammonia nitrogen concentration to reproduce the stinky smell and flavor of stinky tofu. The TSB (trypticase soy broth) is a well-known broth for culturing bacteria, which is known for the culture of E. coli, Staphylococcus aureus, Streptococcus pneumoniae, Bacillus subtilis, Pseudomonas aerugionas, Salmonella typhimurium or the like. The known TSB formulation consists of 17.0 g/L peptone from casein, 3.0 g/L peptone from soybeans, 2.5 g/L of dextrose, 5.0 g/L of sodium chloride and 2.5 g/L of dipotassium phosphate at pH 7.3±0.2 (25° C.). According to the invention, the fermentation broth used for producing the stinky brine comprises 85~153 g/L of tryptone and 15~27 g/L of soytone, at least. Compared to the known TSB formulation above, the fermentation broth according to the invention comprises a trace amount of glucose or even no glucose. It comes from the inventors' understanding that, a high glucose concentration (about 25 g/L) is not beneficial to the growth and deammoniation reaction of the microflora, wherein the ammonia nitrogen concentration would be low and the smell would be less after the fermentation process is finished. Nevertheless, it has been understood that an appropriate increase of tryptone and soytone can enhance the deammoniation reaction of the microflora such that the ammonia nitrogen concentration and the smell is similar to the traditional stinky tofu. Thus, the fermentation broth in one example of the invention may comprise no glucose. In another example, the fermentation broth may comprise a trace amount of glucose. More specific, the fermentation broth according to the invention may comprise 5 g/L or less of glucose, including zero, and preferably comprises 0.5~2.5 g/L of glucose.

Concerning the effect of the osmotic pressure on the microflora growth, the fermentation broth according to the invention may further comprise salts like sodium chloride, dipotassium phosphate or the like. The salt concentration may be 0.75~7.5 g/L based on the fermentation broth and preferably 0.5~5 g/L of sodium chloride and 0.25~2.5 g/L of dipotassium phosphate. More preferably, the fermentation broth according to the invention may comprise 0.5~5 g/L of sodium chloride and 0.25~2.5 g/L of dipotassium phosphate in combination. Although the salt species and concentration thereof have been described herein, the fermentation broth according to the invention is not limited thereto. A person skilled in the art may adjust the salt species and amounts to form a condition suitable for the microflora growth.

According to one embodiment of the invention, the stinky brine and stinky tofu were produced by the following steps. First, a 100 mL-TSB was inoculated with the microflora CCTCC M 98024 in 0.5~1 mL of glycerin and incubated at 30° C. under vibration (125 rpm) for 48 hours. The microflora was thus activated and proliferated. Then, the $OD_{600}$ value of the broth with activated microflora 1 mL was analyzed and diluted until the $OD_{600}$ value was within the range 0.55~0.6. Meanwhile, a 100 mL-fermentation broth comprising 85~153 g/L of tryptone and 15~27 g/L of soytone, 0~5 g/L of glucose, 0.5~5 g/L of sodium chloride and 0.25~2.5 of dipotassium phosphate was prepared. The fermentation broth was inoculated with the activated microflora having an inoculation ratio of 1~5% by volume. The fermentation broth was then incubated at 30 under vibration (125 rpm) for 48 hours to obtain a crucial stinky brine. The crucial stinky brine was further fermented at 30~37° C. for 10~14 days to obtain a fermented stinky brine. The fermented stinky brine showed higher ammonia nitrogen concentrations than the traditional stinky brine and produced the smell and flavor close to the traditional stinky tofu. The prepared stinky brine was used for immersing of the uncooked tofu to form the stinky tofu. The immersion may be performed at room temperature in an open or closed space for about 4~8 hours, but it is not limited thereto.

According to the method of the invention, use of the specific microflora and scientific broth formulations can shorten the fermentation period of the stinky brine and maintain a stable consistency of the stinky tofu, even when accomplished during different seasons or years. Furthermore, the method according to the invention can more easily control the sanitary conditions during the production of stinky tofu and produce the smell and flavor similar to the traditional stinky tofu.

EXAMPLE 1

Effects of Broth Formulations on the Microflora Growth

A marine broth (MB), yeast extract and malt extract broth (YM), nutrient broth (NB) and trypticase soy broth (TSB) were inoculated with the microflora CCTCC M 98023 and CCTCC M 98024 in glycerin at an inoculation ratio of 3~5% by volume. The inoculated broths were incubated at 30° C. under vibration (125 rpm). The microflora growth and ammonia nitrogen concentration produced by the microflora in the broth were observed and recorded.

The ammonia nitrogen concentration was detected by performing the following steps: the inoculated broths were centrifuged at 1200 rpm for 10 min to obtain supernatants; the supernatants were respectively diluted 1000 folds and then added a mineral stabilizer (HACH, Co., Ltd., Colorado, USA) and polyvinyl alcohol dispersing agent (HACH), three drops each; each of the mixtures was vibrated for several seconds and then added 1 mL of Nessler agents (HACH) for a 1-minute vibration; and the absorbance at a light wavelength of 425 nm was detected for the final mixtures.

Figure 1A:
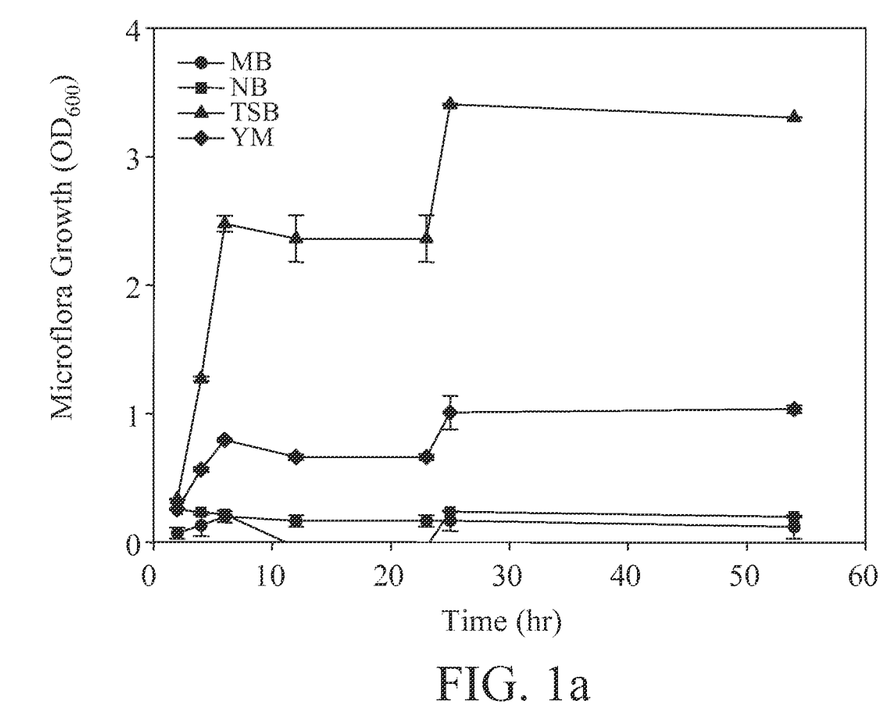
FIG. 1a shows the growth of the microflora CCTCC M 98023 in different broth formulations.
Figure 1B:
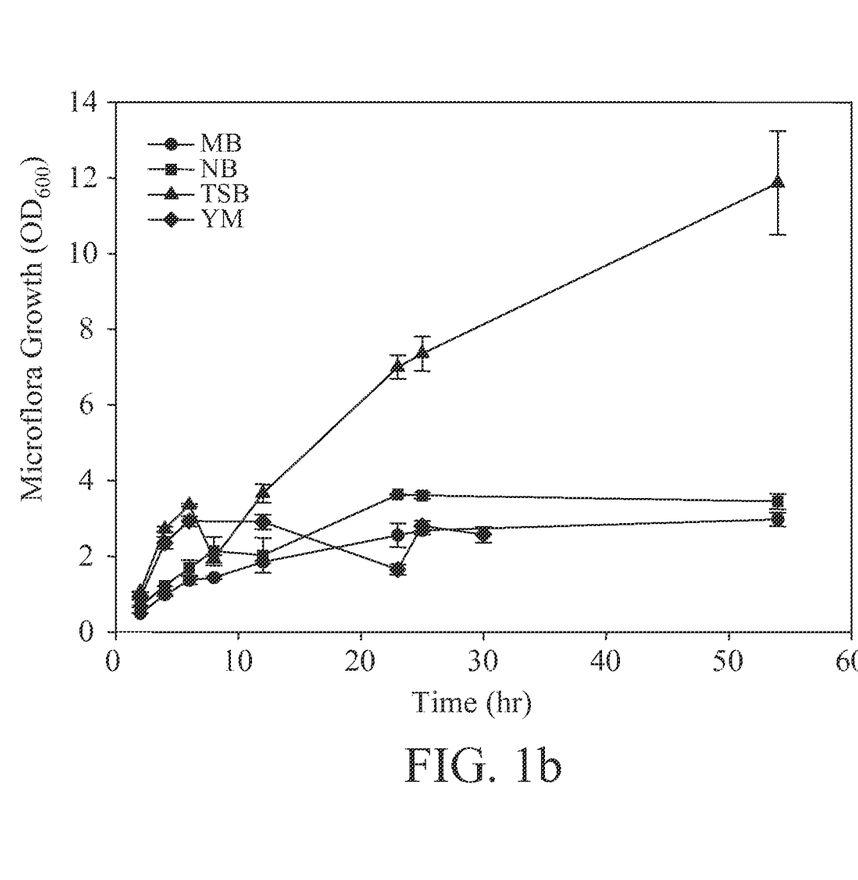
FIG. 1b shows the growth of the microflora CCTCC M 98024 in different broth formulations.
Figure 2A:
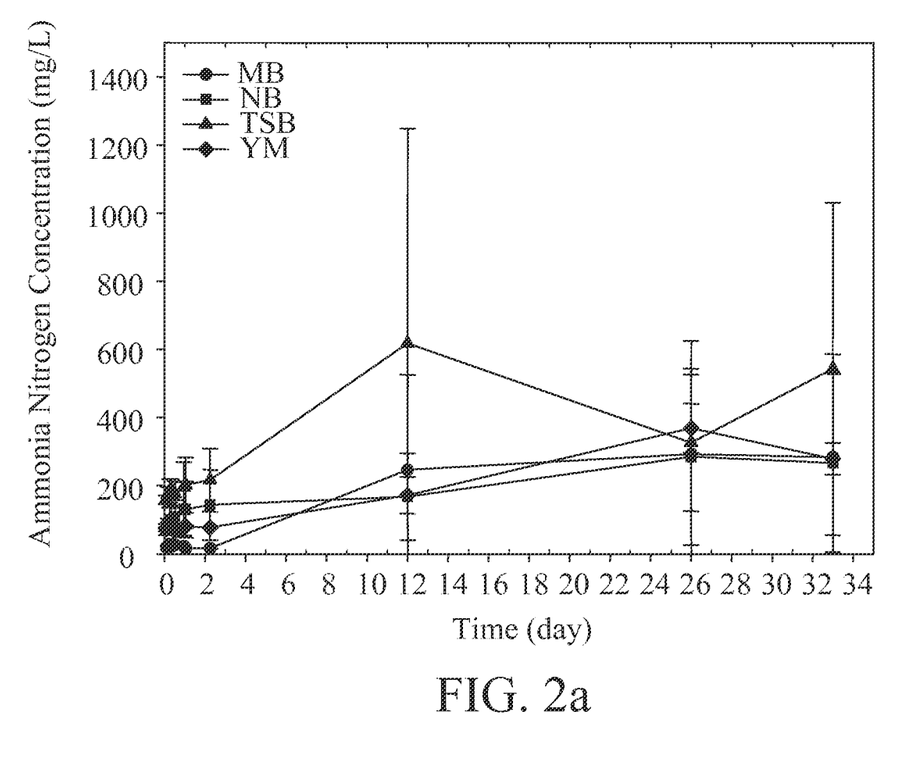
FIG. 2a shows the ammonia nitrogen concentration produced by the microflora CCTCC M 98023 in different broth formulations.
Figure 2B:
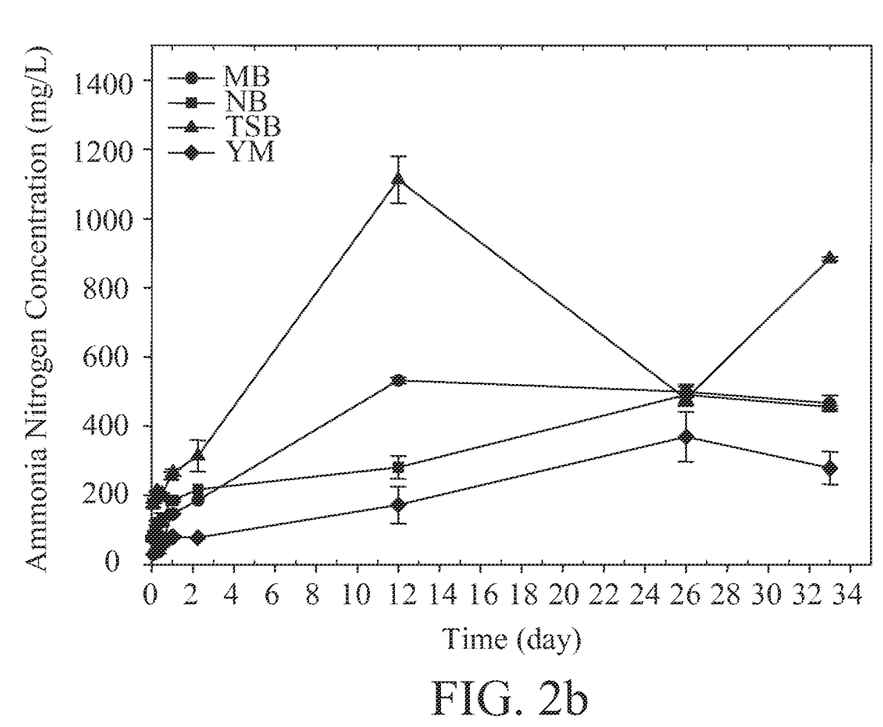
FIG. 2b shows the ammonia and nitrogen concentration produced by the microflora CCTCC M 98024 in different broth formulations.

The results are shown in FIGS. 1a, 1b, 2a and 2b. FIGS. 1a and 2a show the growth of the microflora CCTCC M 98023 and ammonia nitrogen concentration produced by the microflora in the broth. FIGS. 1b and 2b show the growth of the microflora CCTCC M 98024 and ammonia nitrogen concentration produced by the microflora in the broth.

As shown in FIGS. 1a~1b, the growths of the microflora CCTCC M 98023 and CCTCC M 98024 in the TSB were better than those in the other three broths.

In the TSB, the microflora CCTCC M 98023 produced the highest ammonia nitrogen concentration (600 mg/L) on Day 12, and the microflora CCTCC M 98024 produced the highest ammonia nitrogen concentration (about 1200 mg/L) on Day 12.

EXAMPLE 2

Microflora Growth and Ammonia Nitrogen Concentration in the TSB

A TSB was inoculated with the microflora CCTCC M 98023 and CCTCC M 98024 respectively like the procedure of Example 1 at an inoculation ratio of 1% by volume. The microflora growth curve and ammonia nitrogen concentration produced by the microflora in the broth were recorded.

Figure 3:
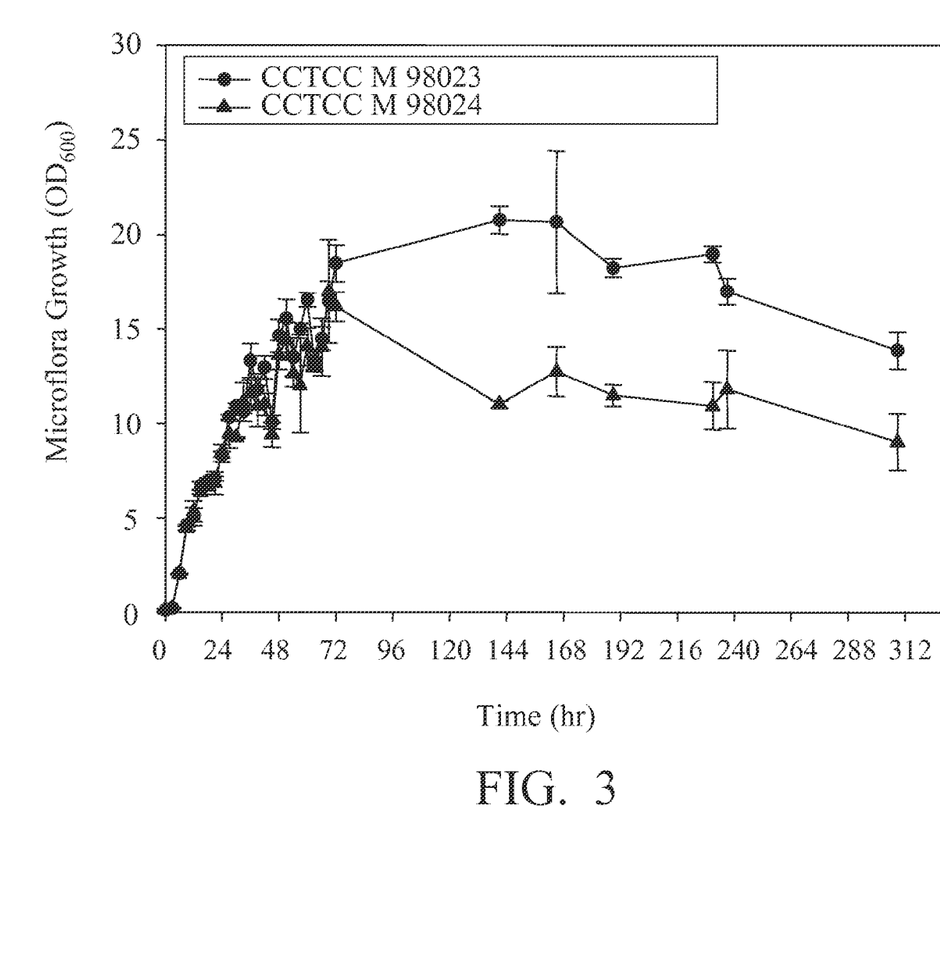
FIG. 3 shows the growth curves of the microflora CCTCC M 98023 and CCTCC M 98024 in the TSB.

The microflora growth curves are shown in FIG. 3. Both of the two microflora grew rapidly within the first three days and then reached a stable growth for several days. Both of the two microflora growth started to decrease on Day 10. In comparison of growth curves, the growth of the microflora CCTCC M 98023 was better than that of the microflora CCTCC M 98024.

Figure 4:
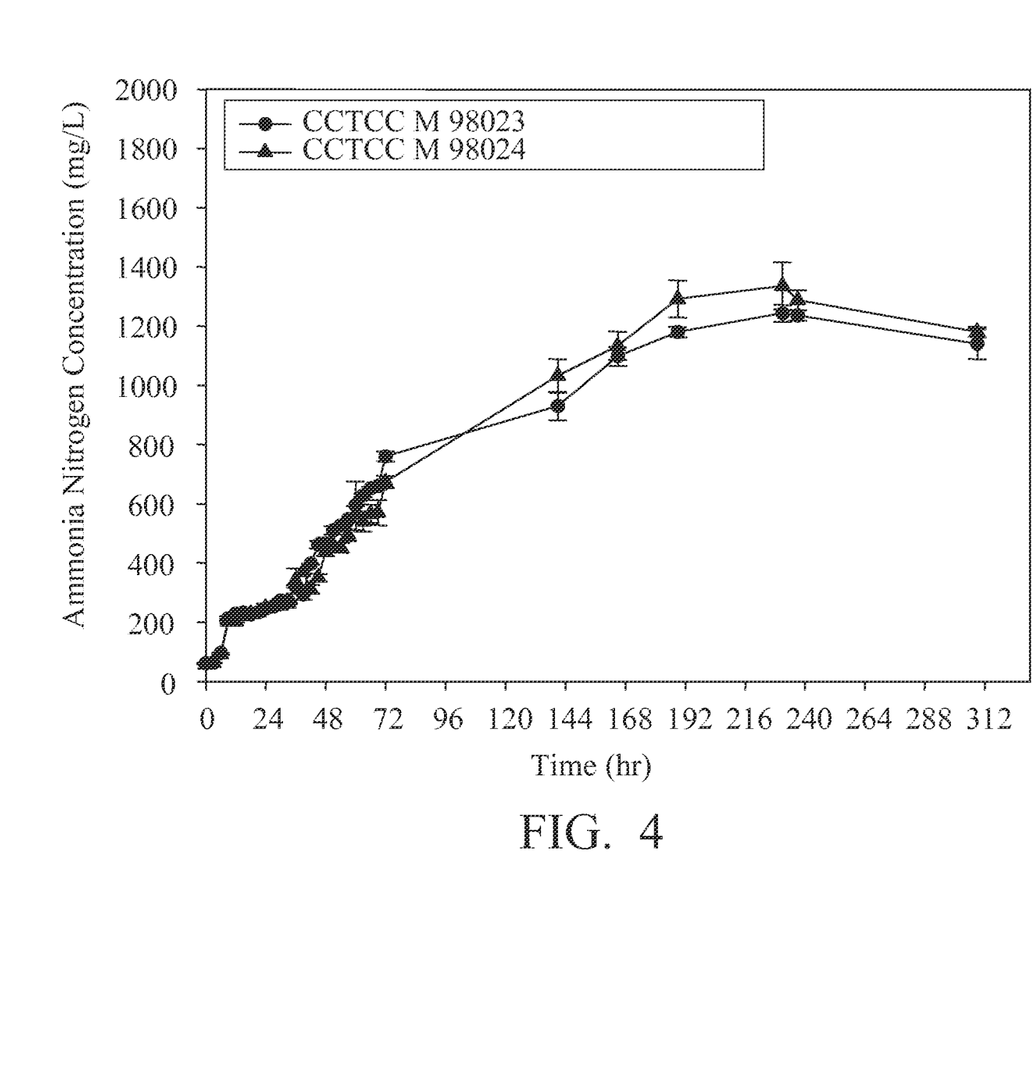
FIG. 4 shows the ammonia nitrogen concentration produced by the microflora CCTCC M 98023 and CCTCC M 98024 in the TSB.

FIG. 4 shows the over-time change of the ammonia nitrogen concentration. Overall, the ammonia nitrogen concentration increased following the incubation time. The over-time change of ammonia nitrogen concentration between the microflora CCTCC M 98023 and CCTCC M 98024 was not significantly different. The ammonia nitrogen concentrations produced by the microflora CCTCC M 98023 and CCTCC M 98024 in the broth both reached to 1300 mg/L on Day 10.

According to FIG. 4, the ammonia nitrogen concentration after a two-week fermentation was lower than that of the traditional stinky brine (2400 mg/L) (Lee, S. F., et al., Optimal conditions for ammonia production of stinky brine, the fermented broth used to make stinky tofu. Taiwanese Journal of Agricultural Chemistry and Food Science (April 2001) 39(2):162-164).

EXAMPLE 3

Microflora Growth and Ammonia Nitrogen Concentration in Modified TSB

The following broths were prepared:

a) a 10-fold concentrated TSB: 25 g/L of dextrose, 170 g/L of tryptone, 30 g/L of soytone, 5 g/L NaCl and 2.5 g/L of $K_2HPO_4$; and b) a low-glucose modified TSB: 12 g/L of dextrose, 170 g/L of tryptone, 30 g/L of soytone, 5 g/L NaCl and 2.5 g/L of $K_2HPO_4$.

The broth a) was inoculated with the microflora CCTCC M 98023 and CCTCC M 98024 respectively at an inoculation ratio of 1% by volume.

The broth b) was inoculated with the microflora CCTCC M 98024 at an inoculation ratio of 1% by volume.

Figure 5:
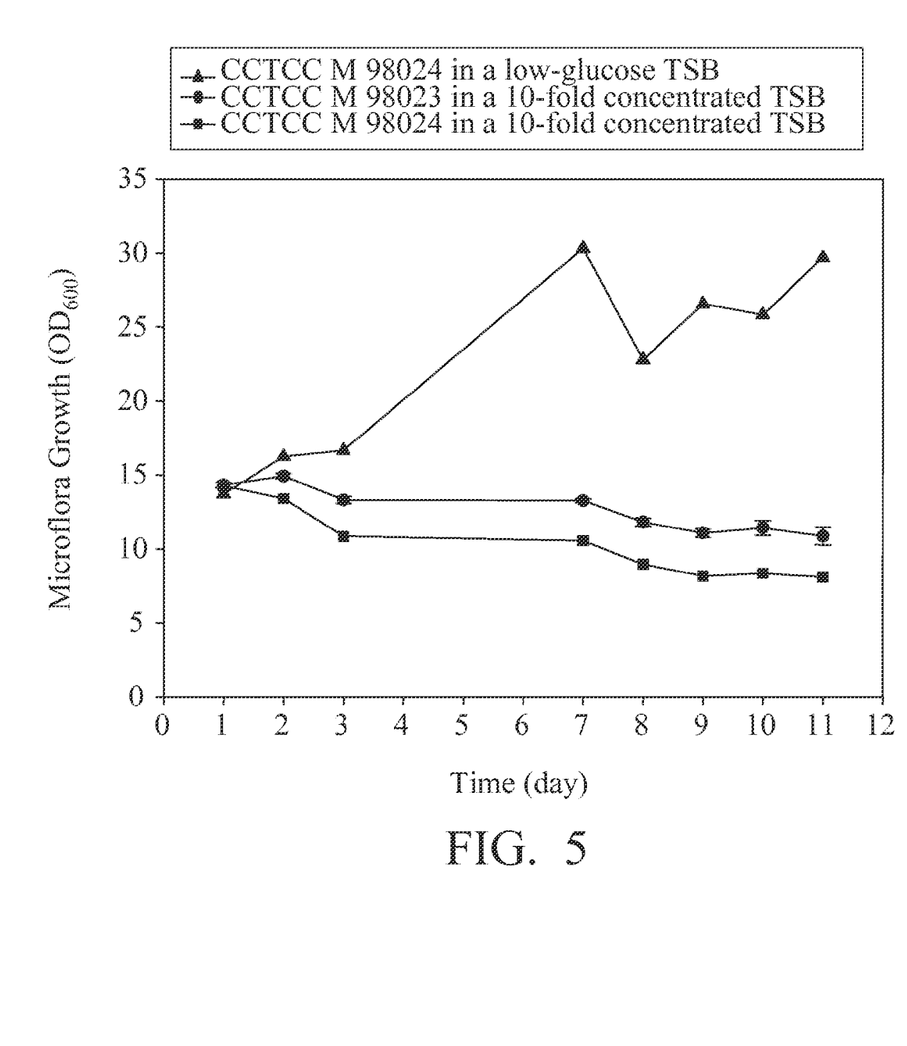
FIG. 5 shows the growth of the microflora CCTCC M 98023 and CCTCC M 98024 in the modified TSB.

The results are shown in FIG. 5. The two microflora showed bad growths in the 10-fold concentrated TSB, while the microflora CCTCC M 98024 showed a better growth in the low-glucose modified TSB. These results suggest that, a high-glucose broth may be disadvantageous to the microflora growth.

Figure 6:
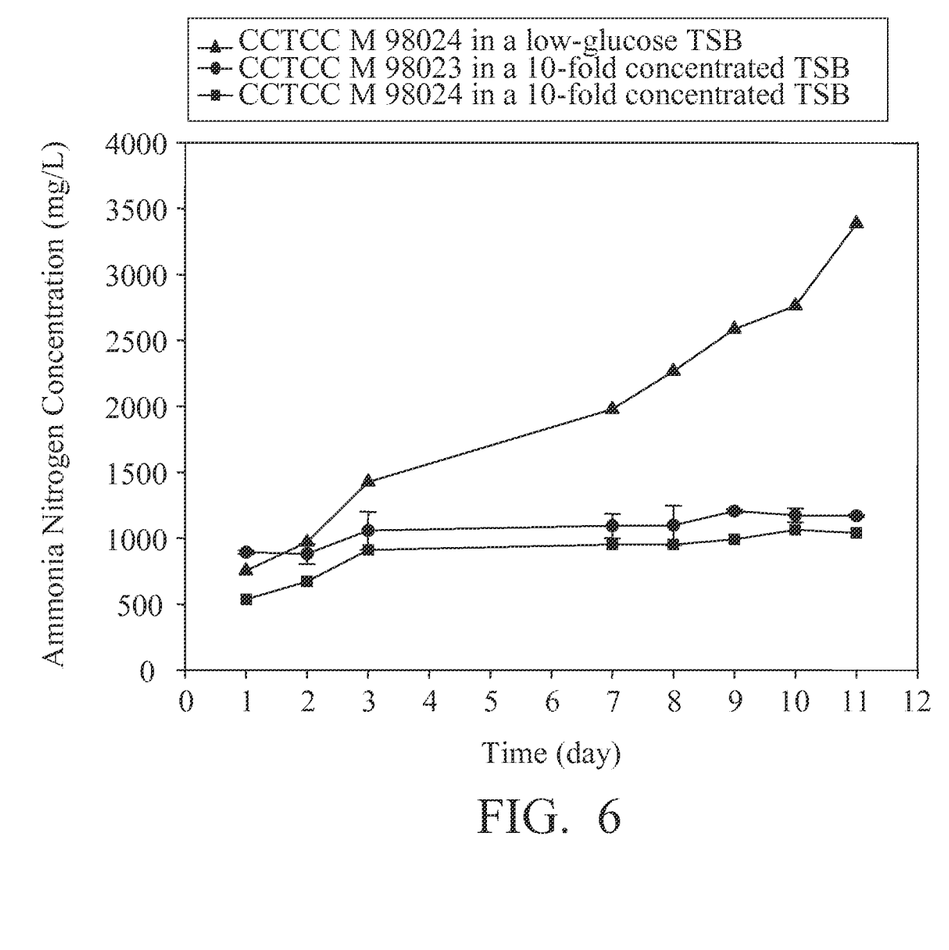
FIG. 6 shows the ammonia nitrogen concentration produced by the microflora CCTCC M 98023 and CCTCC M 98024 in the TSB.

Meanwhile, the over-time changes of the ammonia nitrogen concentration in the broths are shown in FIG. 6. The ammonia nitrogen concentration produced by the microflora CCTCC M 98024 in the low-glucose modified TSB reached 3500 mg/L on Day 11. However, the ammonia nitrogen concentration produced by the microflora CCTCC M 98024 in the 10-fold concentrated TSB was maintained at 1000 mg/L from Day 1 to Day 3. These results suggested that a high concentration of glucose was not beneficial to the microflora growth and deammoniation reaction, while an appropriate increase of tryptone and soytone may enhance the microflora deammoniation reaction.

EXAMPLE 4

Effects of Broth Formulations on Ammonia Nitrogen Concentrations

Broth formulations were prepared. According to the known TSB formulation, the content of dextrose, tryptone and soytone were adjusted to 2.5 g/L of dextrose, 17 g/L of tryptone and 3 g/L of soytone, with the addition of 5 g/L of NaCl and 2.5 g/L of $K_2HPO_4$.

The prepared broth was respectively prepared for 0.2-, 0.5-, 1-, 3-, 5- and 7-fold concentration of dextrose (the dextrose concentration ranged from 0.5 g/L of to 17.5 g/L) and for 0.2-, 0.5-, 1-, 3-, 5 and 7-fold concentration of tryptone and soytone (the tryptone concentration ranged from 3.4 g/L of to 119 g/L, the soytone concentration ranged from 0.6 g/L of to 21 g/L). In combination of the two conditions, there were 36 groups for the study.

Thereafter, each broth was inoculated with the microflora CCTCC M 98023 at 30° C. under vibration (125 rpm) for a 14-day incubation period.

Figure 7A:
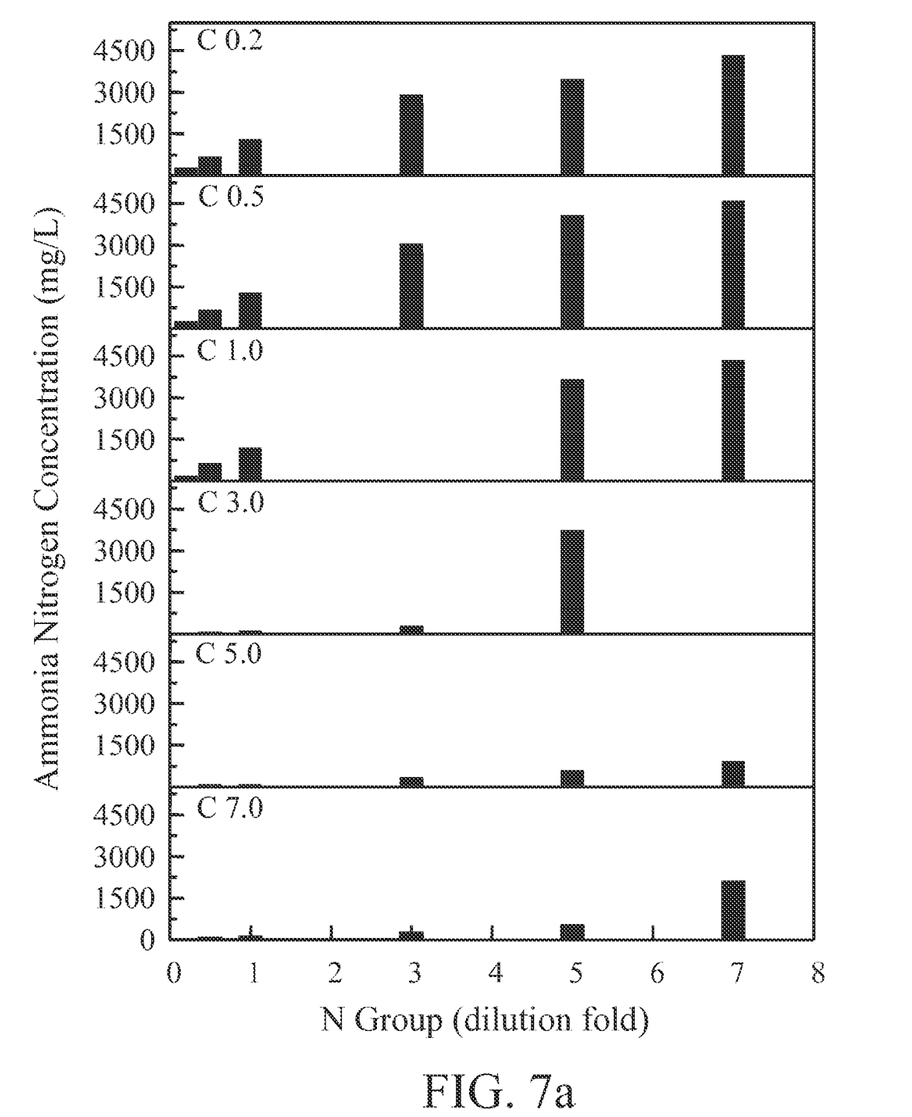
FIG. 7a shows the correlation between the broths with different glucose, tryptone and soytone dilution folds and the ammonia nitrogen concentration produced by the microflora in the broths. The horizontal axis shows the dilution folds of tryptone and soytone (N groups). Each column shows the corresponding glucose dilution folds (C groups 0.2~7.0).
Figure 7B:
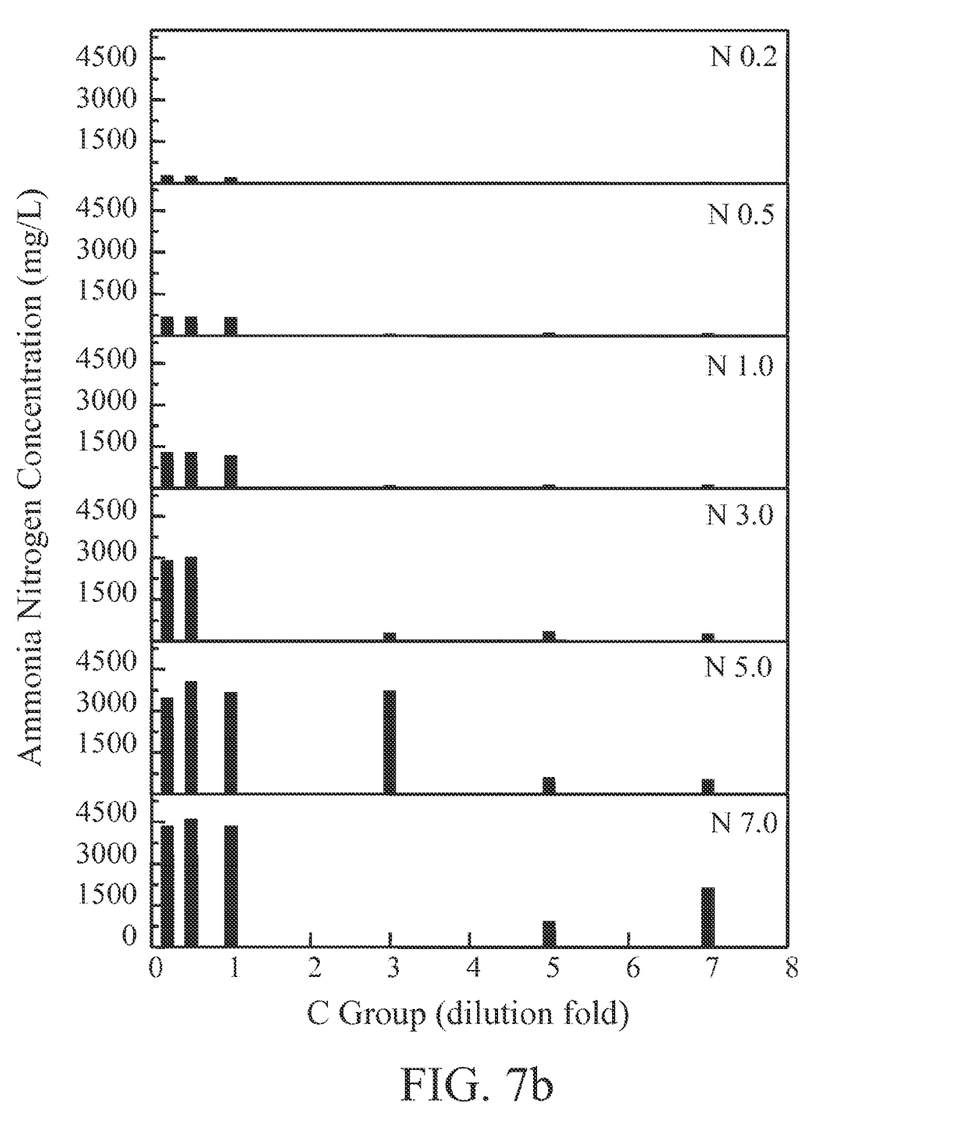
FIG. 7b shows the correlation between the broths with different glucose, tryptone and soytone dilution folds and the ammonia nitrogen concentration produced by the microflora in the broths. The horizontal axis shows the glucose dilution folds (C groups). Each column shows the corresponding dilution folds of tryptone and soytone (N groups 0.2~7.0).

The results are shown in FIGS. 7a-7b. In FIG. 7a, the horizontal axis represents N groups, indicating the concentration folds of tryptone and soytone, and the longitudinal axis represents the ammonia nitrogen concentration, in which the column indicates the concentration folds of glucose (C groups). For instance, "C 0.2" indicates the microflora growth in the broth with a 0.2-fold concentration of glucose. In FIG. 7b, the horizontal axis represents C groups, indicating the concentration folds of glucose, and the longitudinal axis represents the ammonia nitrogen concentration, in which the column indicates the concentration folds of tryptone and soytone (N groups). For instance, "N 0.2" indicates the microflora growth in the broth with a 0.2-fold concentration of tryptone and soytone.

As shown in FIG. 7a, the microflora CCTCC M 98023 in the broth with more than a 5-fold concentration of tryptone and soytone (tryptone concentration >85 g/L, and soytone concentration >15 g/L) produced a high ammonia nitrogen concentration. Meanwhile, the microflora CCTCC M 98023 in the broth with less than a 1-fold concentration of glucose (glucose concentration <2.5 g/L) produced a high ammonia nitrogen concentration (FIG. 7b).

The concentration of glucose, tryptone, soytone and ammonia nitrogen was further plotted to analyze correlations therebetween. The ratio of the glucose concentration folds and tryptone and soytone concentration folds (C/N) was plotted on the horizontal axis and the produced ammonia nitrogen concentration was plotted on the longitudinal axis. The results showed that the microflora in the broth with the C/N ratio 0.5/7 produced higher ammonia nitrogen concentration.

Figure 8:
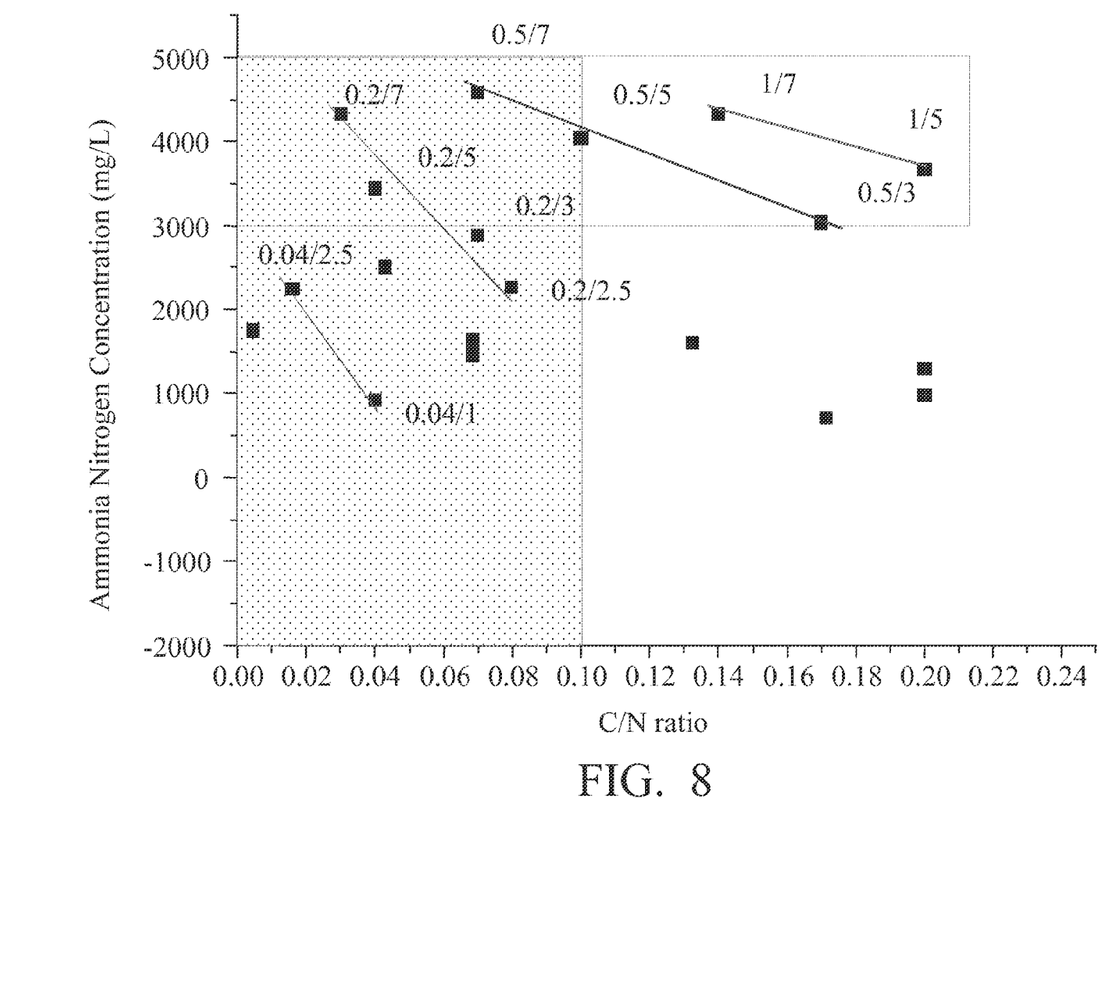
FIG. 8 shows the correlation between the broths with different C/N ratio and the ammonia nitrogen concentration produced by the microflora in the broths.

Accordingly, the correlation of the C/N ratio and the ammonia nitrogen concentration was further analyzed statistically. The C/N ratio and the ammonia nitrogen concentration on days 10, 11 and 12 were recorded and are shown in FIG. 8. According to FIG. 8, the ammonia nitrogen concentration increased following the concentration of tryptone and soytone when the glucose concentration was unchanged (such as C/N=0.2/7, 0.2/5, 0.2/3, 0.2/2.5).

Figure 9:
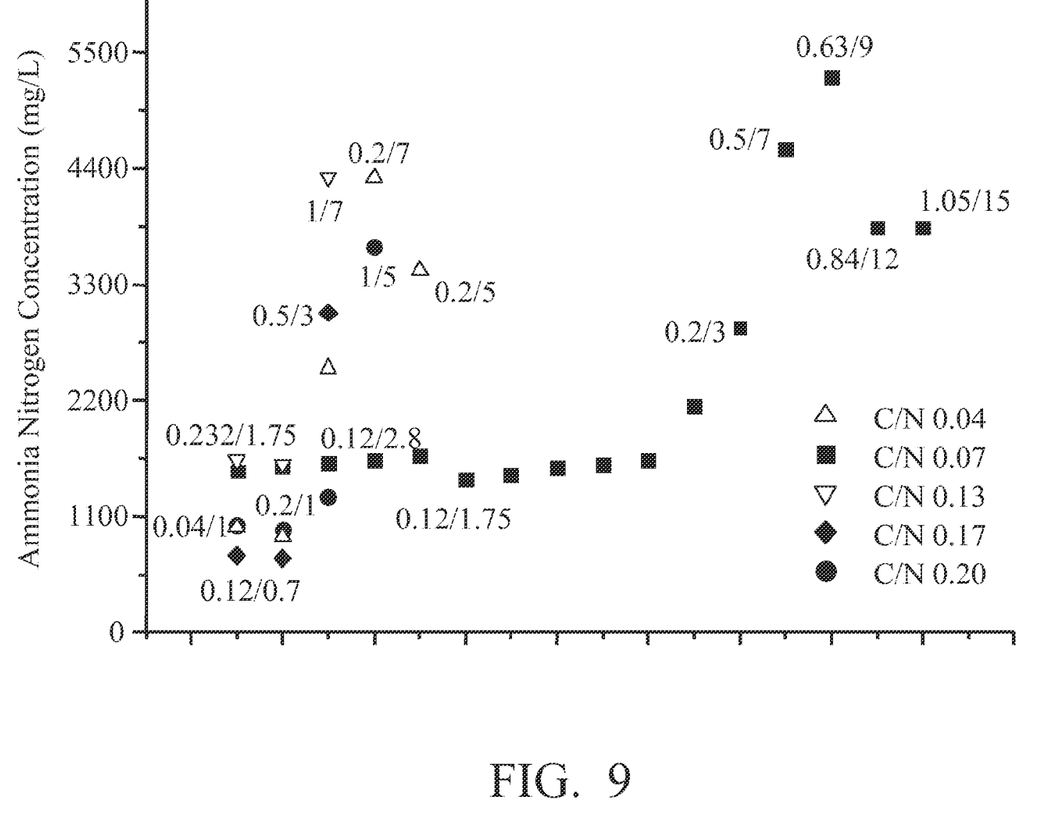
FIG. 9 shows the correlation between the broth with a specific C/N ratio and the ammonia nitrogen concentration produced by the microflora in the broth.

Meanwhile, the effects of the C/N ratio on the ammonia nitrogen concentration were further analyzed. As shown in FIG. 9, the microflora in the broth with the C/N 0.63/9 produced the ammonia nitrogen concentration about 5500 mg/L.

Figure 10:
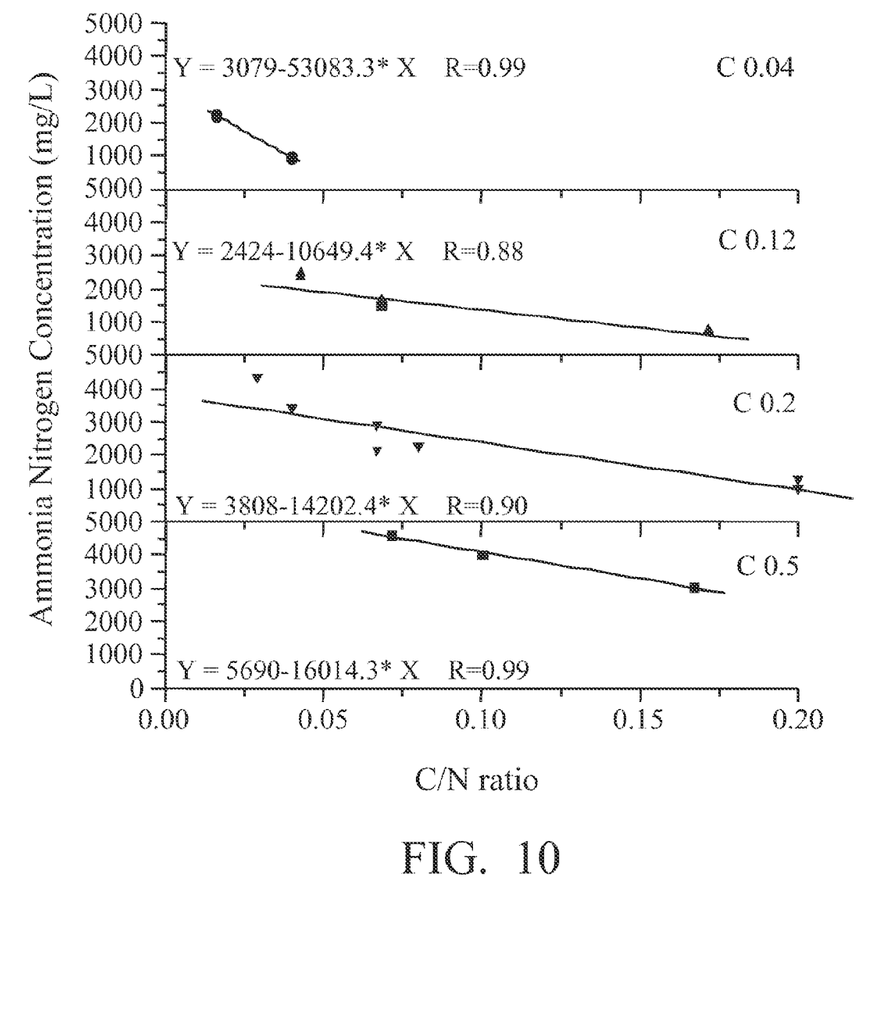
FIG. 10 shows the linear correlation between the broths with the C/N ratio and the ammonia nitrogen concentration produced by the microflora in the broths.

In addition, the broth formulation above with 0.04-, 0.12-, 0.2- and 0.5-fold concentrations of glucose were further analyzed. As shown in FIG. 10, the C/N ratio and the ammonia nitrogen concentration showed a linear relationship. The results showed that, when the glucose concentration was zero (x=0), the intercept showed the highest ammonia nitrogen concentration. The results suggested that the microflora CCTCC M 98023 was able to grow in a broth with less glucose and deammoniation would not be inhibited.

EXAMPLE 5

Effects of Glucose Concentration on Microflora Growth and the Ammonia Nitrogen Concentration Broth formulations were prepared. According to the known TSB formulation, the contents were adjusted to 17 g/L of tryptone, 3 g/L of soytone, 5 g/L of NaCl and 2.5 g/L of $K_2HPO_4$, without glucose.

The prepared broth was respectively prepared for 3-, 7-, 9-, 12- and 15-fold concentration of tryptone and soytone. The control was the broth prepared in Example 4 with the C/N ratio of 0.63/9 (glucose concentration of 1.575 g/L, tryptone concentration of 153 g/L, and soytone concentration of 27 g/L).

Thereafter, each broth was inoculated with the microflora CCTCC M 98023 at 30° C. under vibration (125 rpm) for a 14-day incubation period. The ammonia nitrogen concentration during the incubation period was recorded and is shown in FIG. 11.

Figure 11:
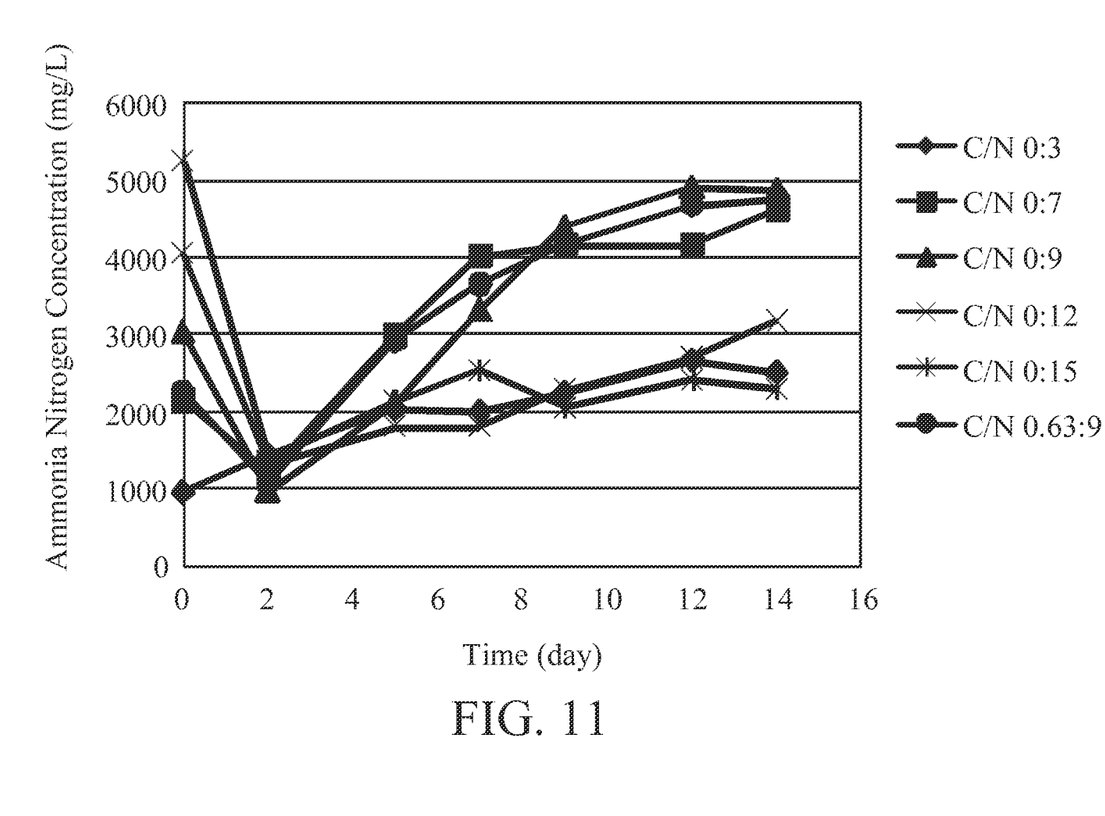
FIG. 11 shows the correlation between the broths with the C/N ratio and the ammonia nitrogen concentration produced by the microflora in the modified broth formulations with or without glucose.

As shown in FIG. 11, the broth without glucose (C/N=0:9 and 0:7) and the control with glucose (C/N=0.63:9) after a 14-day incubation, produced about 5000 mg/L of the ammonia nitrogen concentration. The results showed that the microflora CCTCC M 98023 was able to grow in the broth with low glucose concentration or without glucose, wherein the deammoniation reaction was not influenced.

EXAMPLE 6

Stinky Tofu Taste Assessment

Untreated tofu, stinky tofu purchased from a local market and the stinky tofu obtained from immersion in the following stinky brine for 4 hours at room temperature were fried under the same temperature and time for taste assessment.

The preparation of the stinky brine: a broth comprising 1.26 g/L of dextrose, 122.4 g/L of tryptone, 21.6 g/L of soytone, 5 g/L of sodium chloride and 2.5 g/L of $K_2HPO_4$ was inoculated with the microflora CCTCC M 98023 at 1% by volume of the inoculation ratio. The broth was incubated and fermented at 30° C. under vibration (125 rpm) for 14 days.

The taste assessment was scored. The most favorable taste was scored as 9 and the most unfavorable taste was scored as 1. The assessed result is shown in Table 1. The stinky tofu produced from the above stinky brine scored 5.86, compared to the fried tofu (5.74) and the fried stinky tofu from the market (7.91). These results showed that the stinky tofu produced from the stinky brine was acceptable for the public.

TABLE 1

Results of Stinky Tofu Taste Assessment

| Taster | Fired tofu | Fried stinky tofu produced from the stinky brine of Example 4 | Fried stinky tofu from the market |
|---|---|---|---|
| A | 7 | 8 | 7 |
| B | 6 | 5 | 9 |
| C | 7 | 6 | 7 |
| D | 5 | 5 | 7 |
| E | 7 | 5 | 9.5 |
| F | 4 | 5 | 6 |
| G | 3 | 4 | 5 |
| H | 7.7 | 6.2 | 8.9 |
| I | 6 | 7 | 8.5 |
| J | 4 | 4 | 9 |
| K | 5 | 7 | 9 |
| L | 8 | 7 | 9 |
| M | 5 | 7 | 8 |
| Average | 5.74 | 5.86 | 7.91 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for producing a stinky brine, comprising:
   (i) providing a microflora having the ability to produce the stinky brine;
   (ii) inoculating a fermentation broth with the microflora; and
   (iii) incubating the fermentation broth,
   wherein the fermentation broth comprises 85~153g/L of tryptone and 15~27 g/L of soytone, at least.

2. The method as claimed in claim 1, wherein the fermentation broth further comprises glucose.

3. The method as claimed in claim 2, wherein the concentration of the glucose is 5 g/L or less.

4. The method as claimed in claim 1, wherein the fermentation broth further comprises sodium chloride, dipotassium phosphate or a combination thereof.

5. The method as claimed in claim 1, wherein the microflora comprises *Bacillus, Enterococcus, Lactobacillus* or a combination thereof.

6. The method as claimed in claim 1, wherein the microflora comprises the microflora deposited in the China Center for Type culture collection (CCTCC), having the accession number M 98023, M 98024 or a combination thereof.

7. The method as claimed in claim 1, wherein the density of the microflora is 0.55~0.6 of an optical density at 600nm ($OD_{600}$) before inoculation.

8. The method as claimed in claim 1, wherein the microflora inoculation rate is 1~5% by volume based on the total volume of the fermentation broth.

9. The method as claimed in claim 1, wherein the fermentation broth is incubated under 30~37° C.

10. The method as claimed in claim 1, wherein the fermentation broth is incubated for 10~14 days.

11. A fermentation broth comprising the stinky brine as claimed in claim 1, which transforms tofu into stinky tofu.

12. The fermentation broth as claimed in claim 11, further comprising glucose.

13. The fermentation broth as claimed in claim 12, wherein the concentration of the glucose is 5 g/L or less.

14. The fermentation broth as claimed in claim 11, further comprising sodium chloride, dipotassium phosphate or a combination thereof.

* * * * *